US008136551B2

United States Patent
Pushparaj et al.

(10) Patent No.: US 8,136,551 B2
(45) Date of Patent: Mar. 20, 2012

(54) CARBON NANOTUBE-BASED GAS VALVE

(75) Inventors: Victor L. Pushparaj, Sunnyvale, CA (US); Omkaram Nalamasu, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 860 days.

(21) Appl. No.: 12/201,282

(22) Filed: Aug. 29, 2008

(65) Prior Publication Data
US 2010/0051843 A1 Mar. 4, 2010

(51) Int. Cl.
*F16K 7/04* (2006.01)
(52) U.S. Cl. ..................... 137/625.28; 251/7
(58) Field of Classification Search ............. 137/625.28, 137/625.33; 251/4–10
See application file for complete search history.

(56) References Cited

U.S. PATENT DOCUMENTS

| | | | | |
|---|---|---|---|---|
| 3,316,936 | A * | 5/1967 | Gongwer | 137/625.28 |
| 3,805,830 | A * | 4/1974 | Smith | 137/601.03 |
| 3,900,299 | A * | 8/1975 | Spehrley | 96/73 |
| 5,316,262 | A * | 5/1994 | Koebler | 251/8 |
| 6,589,682 | B1 * | 7/2003 | Fleckner et al. | 429/458 |
| 7,168,675 | B2 * | 1/2007 | Cabuz et al. | 251/7 |
| 7,312,096 | B2 | 12/2007 | Kurtz | |
| 7,320,457 | B2 * | 1/2008 | Heim et al. | 251/129.06 |
| 2004/0173506 | A1 * | 9/2004 | Doktycz et al. | 210/85 |
| 2006/0027499 | A1 * | 2/2006 | Ajayan et al. | 210/636 |

OTHER PUBLICATIONS

Andrews et al., "Continuous Production of Aligned Carbon Nanotubes: A Step Closer to Commercial Realization," Chem. Phys. Lett., 303:467-474 (1999).
Cao et al., "Super-Compressible Foamlike Carbon Nanotube Films," Science, 310:1307-1310 (2005).
Iijima et al., "Structural Flexibility of Carbon Nanotubes", J. Chem. Phys., 104(5):2089-2092 (1996).
Li et al., "Compression-Modulated Tunable-Pore Carbon-Nanotube Membrane Filters", Small oooo, oo, No. o, 1-5 (2007).
Yu et al., "Strength and Breaking Mechanism of Multiwalled Carbon Nanotubes Under Tensile Load", Science 287:637-640 (2000).
Pushparaj et al., "Effects of Compressive Strains on Electrical Conductivities of a Macroscale Carbon Nanotube Block", Applied Physics Letters, 91, 153116 (2007).
Qian et al., "Mechanics of Carbon Nanotubes", Appl. Mech. Rev. 55(6):495-533 (2002).
Sazonova et al., "A Tunable Carbon Nanotube Electromechanical Oscillator", Nature 431:284-287 (2004).

(Continued)

*Primary Examiner* — John Fox
(74) *Attorney, Agent, or Firm* — Mark J. Danielson; Pillsbury Winthrop Shaw Pittman LLP

(57) ABSTRACT

Precise control over gas delivery is achieved at the micro and nanobar mass levels by incorporating blocks of aligned carbon nanotubes into valves and finely adjusting the flow through the block by controlling a compressing force applied to the block. A valve for controlling gas flow includes: a valve housing; a block of aligned carbon nanotubes, the block and the valve housing being configured to direct the gas through the carbon nanotubes in the block; and a device configured to apply a force to the block in order to compress the block, wherein the block is compressed perpendicular to the walls of the carbon nanotubes in the block; whereby the application of the force to the walls restricts the flow of the gas through the valve. The valve may further comprise an electrical device for monitoring the electrical properties of the carbon nanotube block. This monitoring provides information on the state of compression of the carbon nanotube block and/or the gas that is flowing through the valve.

25 Claims, 8 Drawing Sheets

OTHER PUBLICATIONS

Suhr et al., "Fatigue Resistance of Aligned Carbon Nanotube Arrays Under Cyclic Compression", Nature Nanotechnology, vol. 2(7), 417-421 (2007).

Tombler et al., "Reversible Electromechanical Characteristics of Carbon Nanotubes Under Local-Probe Manipulation", Nature 405:769-772 (2000).

Varian, Inc., "Vacuum Technologies: Valves", http://www.varianinc.com/image/vimage/docs/products/vacuum/valves/shared/valves-catalog.pdf, p. 342.

Wei et al., Microfabrication Technology: Organized Assembly of Carbon Nanotubes, Nature vol. 416, 495 (2002).

* cited by examiner

SECTION A-A

SECTION B-B

CARBON NANOTUBE-BASED GAS VALVE

FIELD OF THE INVENTION

The present invention relates generally to gas valves, and more particularly to gas valves comprising carbon nanotubes.

BACKGROUND OF THE INVENTION

There are a multitude of different gas valves available for use in semiconductor process control. The following valves and related flow control devices are used in circumstances where the amount of gas to be delivered is very small (at the micro or even nano mass level).

Vacuum leak valves (sometimes referred to as a type of vacuum throttle valve) are widely used for controlling the flow of gases at very low pressures. A typical leak valve comprises a knife edge seal and is actuated by controlling the pressure applied to a metal diaphragm. Commonly, the actuator is a finely threaded screw in the valve body which applies pressure to the metal diaphragm. (A variable leak valve of this type is available from MDC Vacuum Products, LLC as part number 315002.) Other vacuum leak valves comprise an optically flat sapphire that meets a captured metal gasket to form the seal. The pressure with which the sapphire is held against the gasket is controlled by a movable piston attached to a lever arm mechanism with a mechanical advantage of the order of 10,000 to 1. (A variable leak valve of this type is available from Varian, Inc. as part number 9515106.) The actuator may be manual or computer controlled.

A mass flow controller (MFC) is a device used to measure and control the flow of gas using flow sensors and valves. Proportional valves are often used in MFCs. A proportional valve typically comprises a proportional solenoid or an on/off solenoid operated in a dithering mode. However, MFCs are only available for gas flow control down to the micro mass level, and not for nano mass flow control.

A gas pressure regulator is a valve that automatically stops the flow of gas when a preset pressure is reached on the output side of the valve. A regulator is often installed between the gas source (such as a cylinder of compressed gas) and a MFC or a leak valve (which controls the flow of gas into a process chamber).

For processes such as atomic layer deposition, a controlled pulsed delivery of precursor gases at the micro and nano mass levels will be advantageous.

Therefore, there remains a need in the semiconductor industry for a means of precisely controlling the flow of gases and for delivering gas at micro and even nanobar mass levels. Furthermore, there remains a need for a means of providing a pulsed delivery of gases at micro and nanobar partial pressures.

SUMMARY OF THE INVENTION

The concepts and methods of the invention allow for precise control of gas delivery at the micro and nanobar mass levels. This level of control over gas delivery is advantageous to semiconductor processes such as atomic layer deposition and to medical applications such as anesthetic delivery. Precise control over gas delivery is achieved by incorporating blocks of aligned carbon nanotubes into valves and finely adjusting the flow through the block by controlling a compressing force applied to the block. According to aspects of the invention, a valve for controlling gas flow includes: a valve housing; a block of aligned carbon nanotubes, the block and the valve housing being configured to direct the gas through the carbon nanotubes in the block; and a device configured to apply a force to the block in order to compress the block, wherein the block is compressed perpendicular to the walls of the carbon nanotubes in the block; whereby the application of the force to the walls restricts the flow of the gas through the valve. The device configured to apply a force to the block may comprise: parallel planar walls attached to the block, the walls being parallel to the long axes of the carbon nanotubes in the block; and a mechanical device, configured to apply a force to at least one of the walls, wherein the block is compressed perpendicular to the walls on the application of the force to the walls.

Furthermore, the device configured to apply a force to the block may comprise: parallel planar electrodes attached to the block, the electrodes being parallel to the long axes of the carbon nanotubes in the block; and a voltage supply electrically connected to said parallel plates, said voltage supply being configured to apply a potential difference across said block, wherein said block is compressed perpendicular to the walls of the carbon nanotubes in said block on the application of said potential difference across said block. The valve may further comprise an electrical device for monitoring the electrical properties of the carbon nanotube block. This monitoring provides information on the state of compression of the carbon nanotube block and/or the gas that is flowing through the valve.

According to further aspects of the invention, a method is provided for controlling gas flow including the following steps: maintaining gas at constant pressure on the intake side of a gas valve; restricting gas to flow through a block of aligned carbon nanotubes in the gas valve, wherein the direction of flow is parallel to the long axes of the carbon nanotubes in the block; and controlling a compressive force applied to the block, the compressive force being applied approximately perpendicularly to the long axes of the carbon nanotubes in the block, whereby the application of the force to the block restricts the flow of the gas through the valve. Furthermore, the compressive force may be a pulsed compressive force.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

Figure 1A:
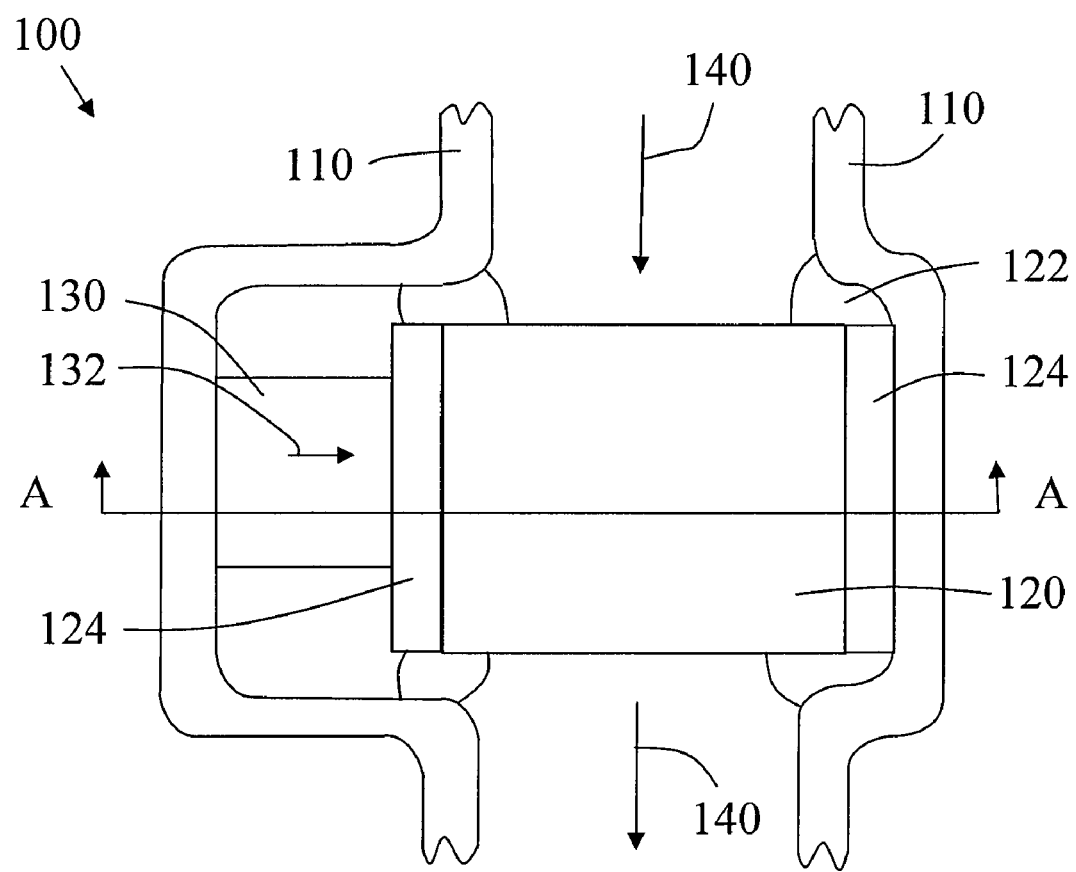
FIG. 1A shows a cross-section in a first plane of a first embodiment of the valve of the invention.

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

In general, the present invention contemplates incorporating blocks of aligned carbon nanotubes into valves and finely adjusting the flow through the block by controlling a compressing force applied to the block. Although the examples provided herein are in the context of semiconductor processing using gases, there is no intention to limit the invention to devices and methods for semiconductor processing or gas flow control. For example, valves comprising blocks of aligned carbon nanotubes may be used to control delivery of medical anesthetics, and to control delivery of liquids.

Carbon nanotubes are nanometer-scale cylinders with walls formed of graphene—single atom thick sheets of graphite. Nanotubes may be either single-walled (cylinder wall composed of a single sheet of graphene, referred to as SWNTs) or multi-walled (cylinder wall composed of multiple sheets of graphene, referred to as MWNTs). Nanotubes have diameters as small as one nanometer, for a SWNT, and length to diameter ratios of the order of $10^6$. Blocks of carbon nanotubes, where the nanotubes are aligned parallel to each other along their lengths, can be grown using chemical vapor deposition techniques. These blocks may have end areas of the order of 1 to 100 square millimeters, lengths (measured along the direction of the aligned nanotubes) of 0.2 to 4 millimeters, porosities of 87-92%, and contain millions of carbon nanotubes. See Cao et al., Super-compressible Foam-like Carbon Nanotube Films, Science vol. 310, 1307-1310 (2005). The center-to-center spacing of nanotubes in a block can be predetermined in the range of 10 to 200 nm by the spacing of catalyst particles. See Wei et al., Microfabrication Technology: Organized Assembly of Carbon Nanotubes, Nature vol. 416, 495 (2002); and Andrews et al., Continuous Production of Aligned Carbon Nanotubes: A Step Closer to Commercial Realization, Chem. Phys. Lett. vol. 303, 467-474 (1999).

Nanotubes exhibit extraordinary mechanical properties, including supercompressibility (greater than 33%), and high bending and compressive strengths (14 GPa and 100 GPa, respectively, for MWNTs). See Saito et al., Physical Properties of Carbon Nanotubes, Imperial College Press, London (1998); Tombler et al., Nature vol. 405, 769 (2000); Cao et al., Science vol. 310, 1307 (2005); Qian et al., Appl. Mech. Rev. vol. 55, 495 (2002); Iijima et al., J. Chem. Phys. vol. 104, 2089 (1996); Sazonova et al., Nature vol. 431, 284 (2004); and Min-Feng et al., Science vol. 287, 637 (2000). These physical properties are advantageous for use of carbon nanotubes in valves. The present invention contemplates using blocks of SWNTs and/or MWNTs to controllably restrict flow through a valve.

Furthermore, blocks of carbon nanotubes have electrical and mechanical properties that are advantageous in the use of carbon nanotube blocks for controlling gas flow. For example, the electrical properties of carbon nanotubes allow the presence of certain chemical species in the gas flowing through the block to be detected. Also, carbon nanotube blocks exhibit large changes in conductivity in response to strain (0.02 Siemens per centimeter change in conductivity per 1% change in compressive strain), which provides feedback to determine the extent to which the block is being compressed, and therefore the gas conductance of the block. See Suhr et al. Nature-Nano. vol. 2(7), 417 (2007).

Nanotubes are also hydrophobic and the structural integrity of a nanotube block is unaffected by water. This is advantageous when nanotubes are used in gas delivery systems that may have residual moisture.

Figure 1B:
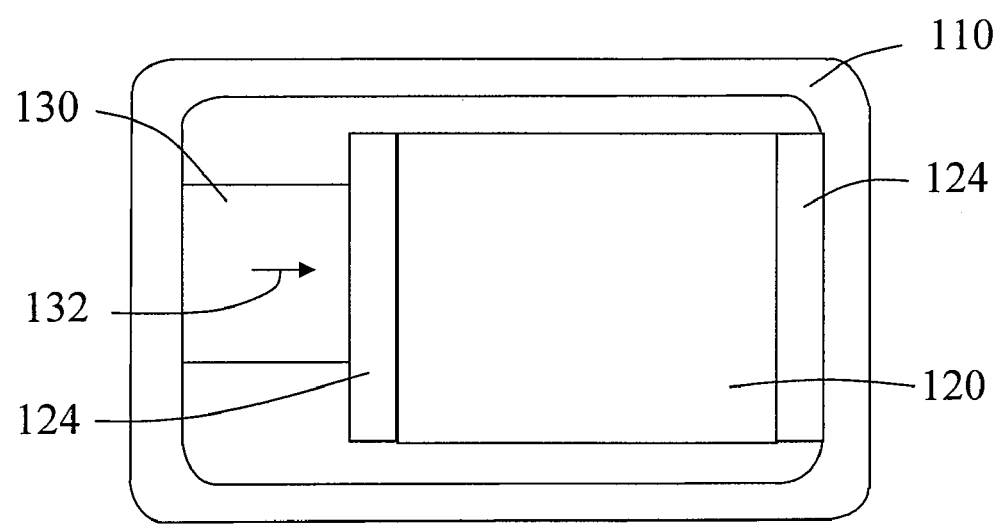
FIG. 1B shows a cross-section in a second plane of the valve of FIG. 1A, where the second plane is perpendicular to the first plane.

FIG. 1A shows a cross-section in a first plane of a first embodiment of the valve of the invention. FIG. 1B shows a cross-section in a second plane of the valve of FIG. 1A, where the second plane is perpendicular to the first plane. The valve 100 comprises a housing 110, a carbon nanotube block 120 and an actuator 130. An actuator is a device which translates an input signal, such as an electrical signal, into motion. Here, the actuator 130 may be a manual actuator, such as a threaded screw or an electrical actuator such as a piezoelectric drive. The carbon nanotube block 120 is generally cuboid (a solid bounded by 6 rectangular faces) and is fixed in place by an adhesive material 122. The adhesive material 122 also serves to provide a seal between the block 120 and the wall of the valve housing 110, so that the gas flowing through the valve 100 must all pass through the block 120. The adhesive material 122 may need to be: vacuum compatible; be able to withstand heating to 450° C.; and be sufficiently compliant to allow for significant compression of the block 120. The carbon nanotubes in the block 120 are aligned with their long axes parallel to each other and the block is orientated in the valve housing so that the nanotubes are aligned with the flow of gas, indicated by arrows 140. Parallel walls 124 are on opposite faces of the block 120, the walls 124 are parallel to the alignment of the carbon nanotubes in the block 120, and the walls 124 may be used to maintain the mechanical integrity of the block 120 and/or to make electrical contact to the block 120. Some embodiments of the valve (not shown) do not comprise walls 124. The actuator 130 is positioned between the wall of the valve housing 110 and the block 120. When the actuator 130 is activated, a force 132 is applied to the block 120 to compress the block. (The force is transferred through the wall 122). When the block 120 is compressed the flow through the valve 100, shown by arrows 140, is reduced. Due to the supercompressibility of the block of carbon nanotubes, the flow through the block 120 can be varied substantially. Furthermore, due to the elasticity of carbon nanotubes the block 120 can be repeatedly compressed and yet recover its original shape.

In FIG. 1, the actuator 130 may include a mechanical or electromechanical device for applying a compressive force to the carbon nanotube block 120. It will be appreciated by those skilled in the art that there are many variations on the actuator 130. For example, the actuator 130 may include a vise, as described below in reference to FIG. 2, a piston, and/or a piezoelectric drive. The compressive force may be applied directly to one side of the block 120, as shown in FIG. 1A, or to both sides of the cuboid block 120. Furthermore, the actuator 130 may be manually operated or electrically operated.

Figure 2:
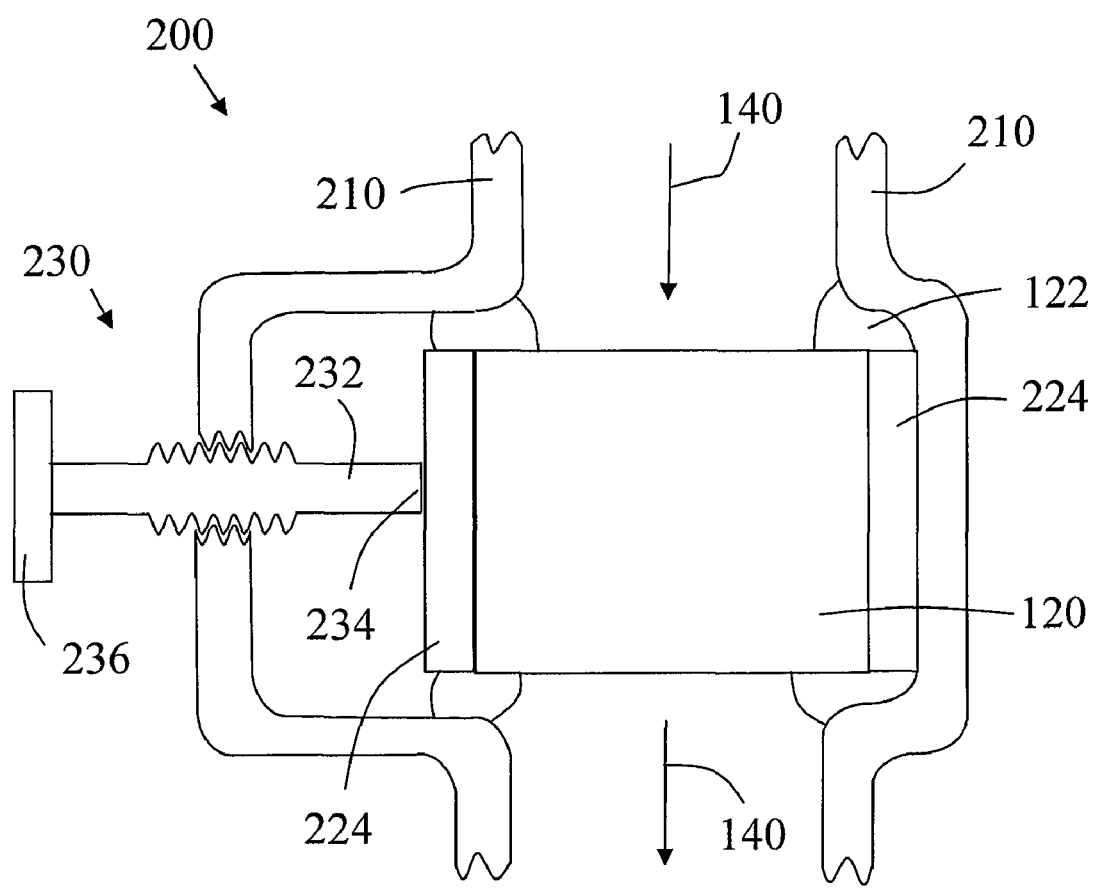
FIG. 2 shows a vise-type device of the invention, for compressing the carbon nanotube block in the valve.

FIG. 2 shows a vise-type device of the invention, for compressing the carbon nanotube block in the valve. The valve 200 comprises a housing 210, a carbon nanotube block 120 and a mechanical actuator 230. The mechanical actuator 230 comprises a threaded bolt 232 with a rounded end 234 for pushing against the wall 224 and a control knob 236 for screwing the bolt into and out of the valve housing 210. The valve housing 210 contains a circular threaded aperture for receiving the threaded bolt 232. As the bolt 232 is screwed into the valve housing 210 the end 234 pushes against the wall 224 compressing the carbon nanotube block 120. It will be appreciated by those skilled in the art that there are many variations on the mechanical actuator 230, including the addition of a lever arm to provide mechanical advantage and the addition of a motor to screw the bolt into and out of the valve housing.

Figure 3A:
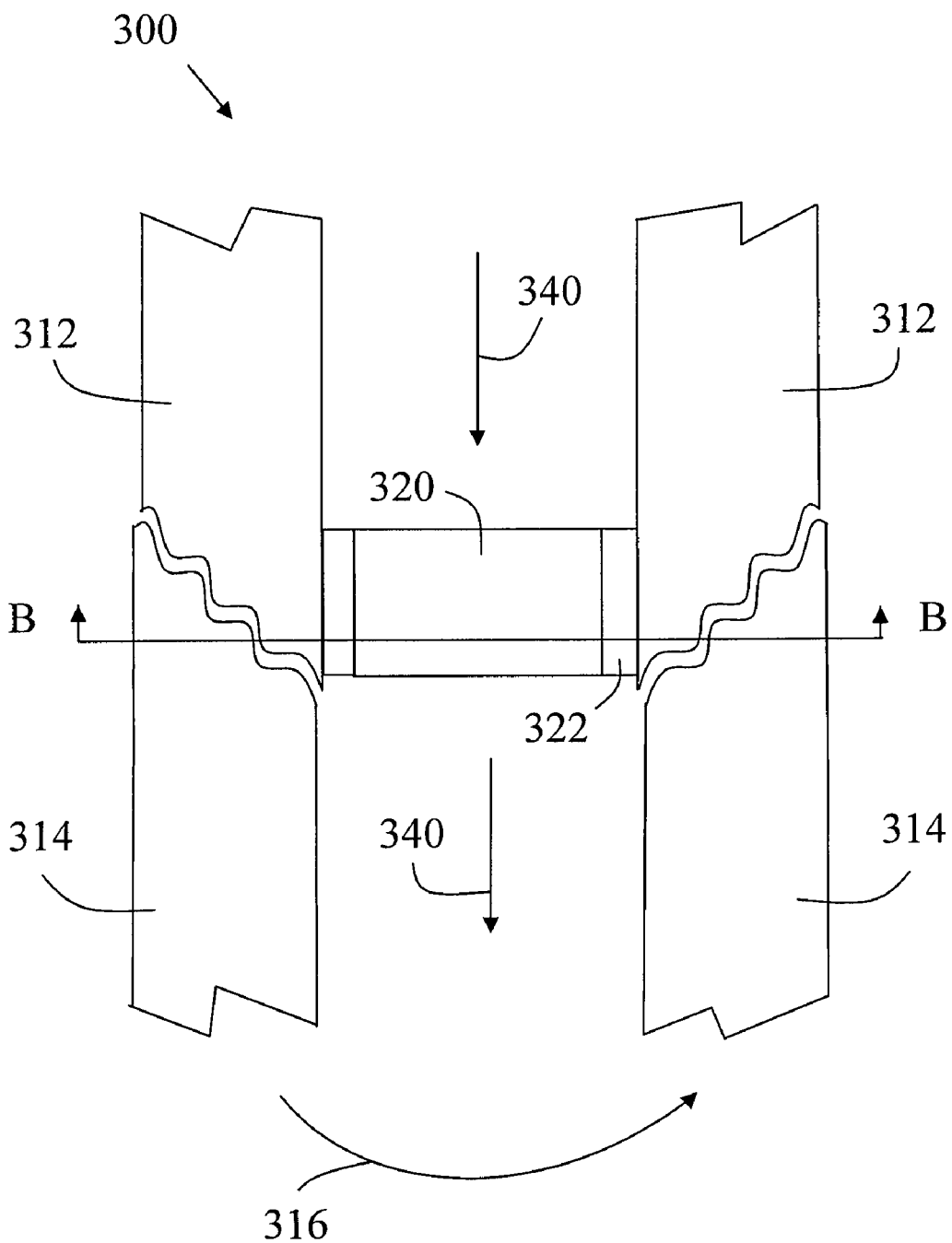
FIG. 3A shows a cross-section in a first plane of a second embodiment of a valve of the invention.
Figure 3B:
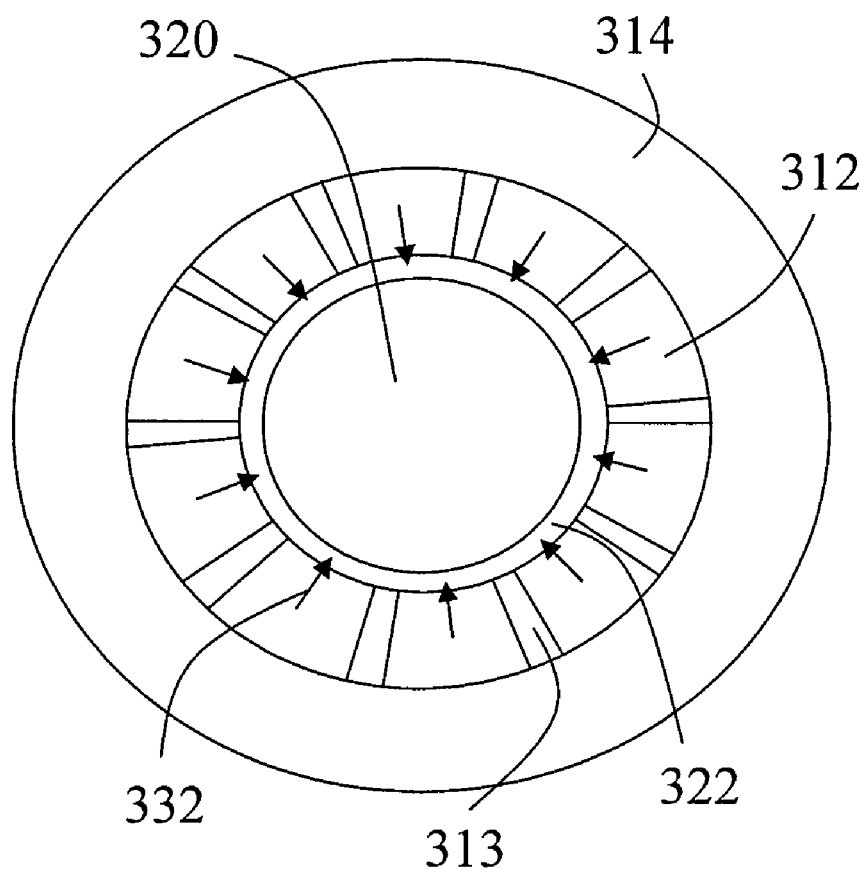
FIG. 3B shows a cross-section in a second plane of the valve of FIG. 3A, where the second plane is perpendicular to the first plane.

FIG. 3A shows a cross-section in a first plane of a second embodiment of a valve of the invention. FIG. 3B shows a cross-section in a second plane of the valve of FIG. 3A, where the second plane is perpendicular to the first plane. The valve 300 comprises a carbon nanotube block 320 and a valve housing with a first part 312 and a second part 314. The first and second parts are hollow cylinders with threaded ends which are configured to screw together and compress the block 320. The force applied to the block is indicated by arrows 332 in FIG. 3B and is seen to be radially uniform. Arrow 316 shows the direction in which the second part 314 is turned in order to compress the lower end of first part 312, and therefore the block 320. The first part 312 has slits 313 at its lower end to allow the first part 312 to be screwed into the second part 314. The block 320 is cylindrical in shape and is fixed in place by an adhesive material 322. The adhesive material 322 also serves to provide a seal between the block 320 and the wall of the first part of the valve housing 312, so that the gas flowing through the valve 300 must all pass through the block 320. The carbon nanotubes in the block 320 are aligned with their long axes parallel to each other and the block is orientated in the valve housing so that the nanotubes are aligned with the flow of gas, indicated by arrows 340. It will be appreciated by those skilled in the art that there are many variations of the valve housing shown in FIGS. 3A and 3B, which will produce a radially uniform compressive force on the carbon nanotube block 320.

Figure 4:
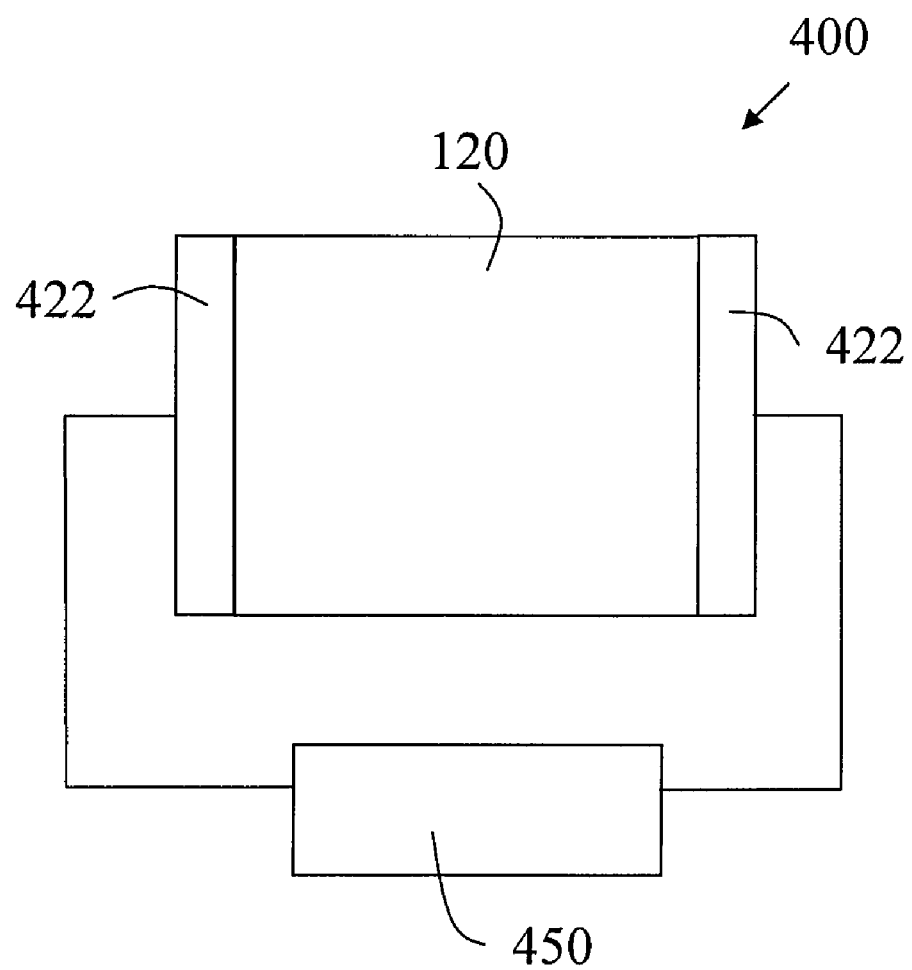
FIG. 4 is a schematic diagram of a diagnostic circuit for use with the valve of the invention.

FIG. 4 is a schematic diagram of a diagnostic circuit 400 for use with the valve of the invention. Diagnostic circuit 400 comprises a cuboid carbon nanotube block 120, conductive parallel plates 422 on opposing sides of the block, where the plane of the plates is parallel to the aligned carbon nanotubes in the block, and diagnostic electronics 450 electrically connected to the plates 422 for characterizing the electrical properties of the block 120. The electrical properties of the block 120 may change due to adsorption and even chemical bonding of gas molecules on the surface of the carbon nanotubes. The electrical characteristics may be used to identify particular gas species. For example, the presence of $NO_2$ gas may be determined. See http://www.nasa.gov/centers/ames/research/technology-onepagers/gas_detection.html (last visited Jun. 26, 2008). Furthermore, the diagnostic circuit 400 can be used to monitor the conductivity of the carbon nanotube block 120, which provides feedback to determine the extent to which the block is being compressed, and therefore the gas conductance of the block 120.

Figure 5:
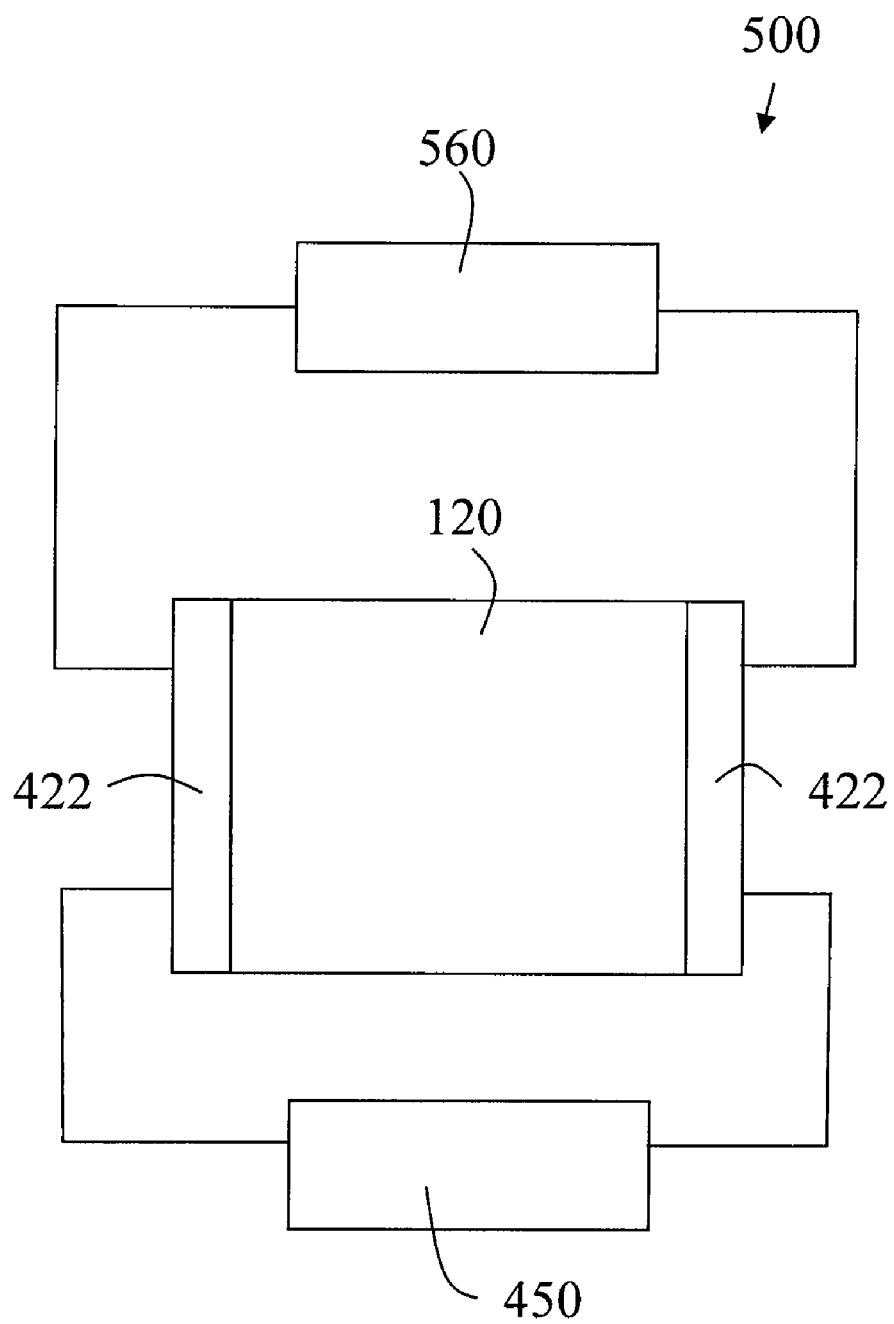
FIG. 5 shows a schematic diagram for an electrostatically operated valve of the invention.

FIG. 5 shows a schematic diagram for an electrostatically operated valve 500 of the invention. The electrostatically operated valve 500 comprises a nanotube block 120, conductive parallel plates 422 on opposing sides of the block, where the plane of the plates is parallel to the aligned carbon nanotubes in the block, and a voltage supply 560. Depending on the electrical properties of the block 120, insulating layers (not shown) may be required between the block 120 and the plates 422. The voltage supply 560 may be a direct current supply or a pulse signal generator. The electrostatically operated valve works by building up opposite charges on the opposing plates 422. The oppositely charged plates 422 attract and compress the block of carbon nanotubes 120 between them, thus reducing the flow of gas through the block 120. The compressive force per unit area is determined roughly by the potential difference between the plates 422, the spacing between the plates and the dielectric constant of the carbon nanotube block 120. Reducing the potential difference between the plates 422 results in a reduction in the compressive force on the block 120. Providing approximately 80% strain is not exceeded, the block 120 will return to its original size when the compressive force is removed. It is expected that the block 120 will respond mechanically to the application of a voltage pulse within a few milliseconds.

A further embodiment of the valve of FIG. 5 includes a block 120 in which one or more walls of the block are coated with an insulating, piezoelectric polymer, such as polyvinylidene fluoride (PVDF), such that PVDF exists between one or more of plates 422 and block 120. (The piezoelectric polymer layer is not shown in the figure.) When a potential difference is applied across the plates 422 the piezoelectric PVDF will contribute to the compressive force on the block 120. Alternatively, the block may be infiltrated with PVDF polymer, such that there is sufficient PVDF to have a compressive effect when a potential difference is applied, and yet sufficient porosity of the block to allow for gas to flow through the block.

Furthermore, the diagnostic circuit of FIG. 4 may be readily integrated with valve 500, as shown in FIG. 5.

Figure 6:
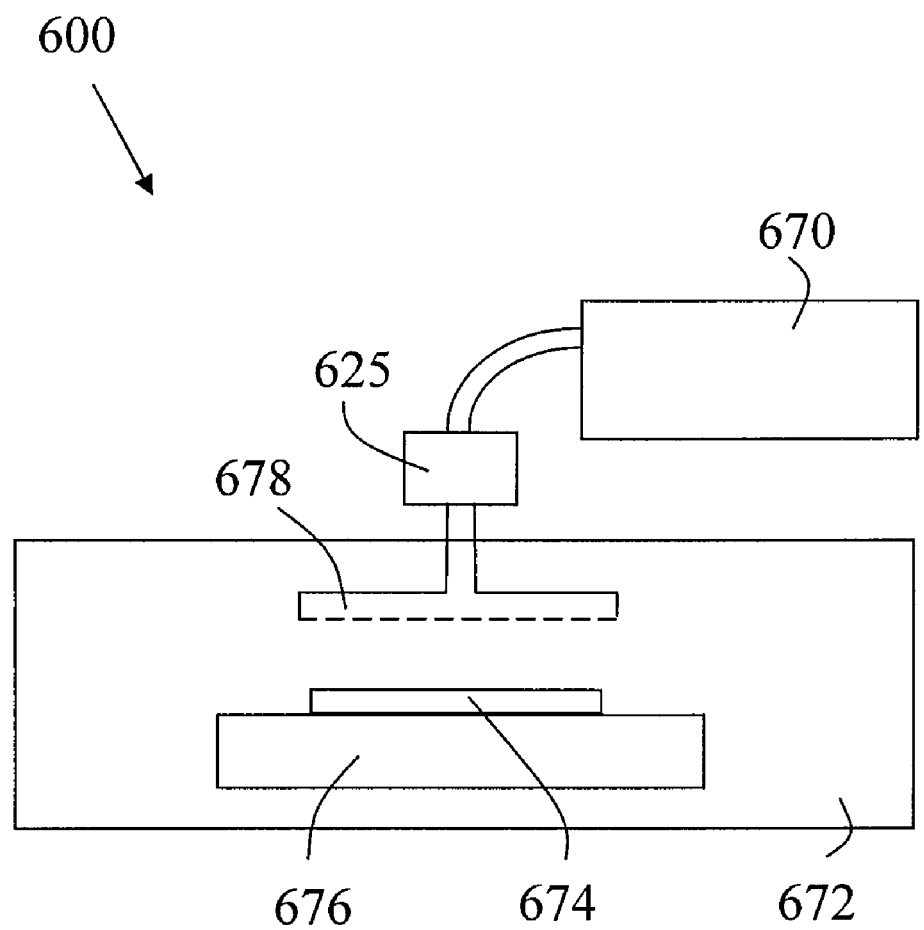
FIG. 6 shows a representation of a vacuum processing system incorporating a valve of the invention.

FIG. 6 shows a representation of a vacuum processing system 600 incorporating a valve of the invention. Gas flows from a gas source 670 through a pipe to the vacuum processing chamber 672. The carbon nanotube valve 625 provides very accurate control of the flow of gas through the pipe into the chamber 672. The chamber contains a substrate 674 held on a platen 676 and situated below a gas distributor 678. The gas source 670 will generally include a gas regulator and the gas pressure at the inlet to the valve 625 will be held constant. Another valve (not shown) may also be included in series with the carbon nanotube valve 625 for shutting off the gas supply to the chamber 672. (The function of the carbon nanotube valve 625 is to control gas flow, and not to act as a shut-off valve).

The process chamber 672 in FIG. 6 may be an atomic layer deposition chamber and the carbon nanotube valve 625 may be utilized to provide very fine control of a precursor gas as it is leaked into the process chamber 672 through the gas distributor 678. Furthermore, the valve 625 may be operated in a pulsed mode to allow controlled pulses of precursor gas into the chamber 672. It will be appreciated by those skilled in the art that there are many variations on the process system 600 shown in FIG. 6, including a system with multiple gas sources 670 controlled by multiple carbon nanotube valves 625.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A valve for controlling flow of a gas, comprising:
a valve housing;
a block of aligned carbon nanotubes, said block and said valve housing being configured to direct said gas through the carbon nanotubes in said block; and
a device for applying a force to compress said block of aligned carbon nanotubes, wherein said block of aligned carbon nanotubes is compressed perpendicular to the walls of the carbon nanotubes in said block;
whereby the application of said force to said walls restricts the flow of said gas through said valve.

2. The valve of claim 1, wherein said device comprises:
parallel planar electrodes attached to said block, said electrodes being parallel to the long axes of the carbon nanotubes in said block; and
a voltage supply electrically connected to said parallel plates, said voltage supply being configured to apply a potential difference across said block, wherein said block is compressed perpendicular to the walls of the carbon nanotubes in said block on the application of said potential difference across said block.

3. The valve of claim 2, wherein said voltage supply is a pulse signal generator.

4. The valve of claim 2, wherein said voltage supply is a direct current supply.

5. The valve of claim 2, further comprising an electrical device for monitoring the electrical properties of said block.

6. The valve of claim 2, wherein said block is infiltrated with piezoelectric polymer.

7. The valve of claim 1, wherein said block is comprised of single walled carbon nanotubes.

8. The valve of claim 1, wherein said block is comprised of multi-walled carbon nanotubes.

9. The valve of claim 1, wherein said block is sealed to said valve housing using a vacuum-compatible adhesive material.

10. The valve of claim 1, wherein said device comprises:
parallel planar walls attached to said block, said walls being parallel to the long axes of the carbon nanotubes in said block; and
a mechanical device, configured to apply a force to at least one of said walls, wherein said block is compressed perpendicular to the walls on the application of said force to said walls.

11. The valve of claim 10, wherein said mechanical device is a screw configured to apply a force to the outer surface of one of said walls.

12. The valve of claim 10, wherein said mechanical device is an actuator configured to apply a force to the outer surface of one of said walls.

13. The valve of claim 10, further comprising:
an electrical device for monitoring the electrical properties of said block, said electrical device being electrically connected to said walls;
wherein said walls are electrically conductive.

14. The valve of claim 1, wherein said device is a means for compressing said block of aligned carbon nanotubes.

15. The valve of claim 1, wherein said device comprises:
first and second electrodes on opposing sides of said block, said electrodes being planar and roughly parallel to the walls of the carbon nanotubes in said block;
wherein between said first and second electrodes and said block are corresponding first and second layers of insulating piezoelectric polymer.

16. A method of controlling gas flow comprising the steps of:
maintaining gas at constant pressure on the intake side of a gas valve;
restricting gas to flow through a block of aligned carbon nanotubes in said gas valve, wherein the direction of flow is parallel to the long axes of the carbon nanotubes in said block; and
controlling a compressive force applied to said block, said compressive force being applied approximately perpendicularly to the long axes of the carbon nanotubes in said block, whereby the application of said force to said block restricts the flow of said gas through said valve.

17. A method as in claim 16, wherein said compressive force is a pulsed compressive force.

18. A method as in claim 16, wherein said controlling step includes application of a force to said block by a mechanical means.

19. A method as in claim 16, wherein said controlling step includes application of a potential difference between parallel plates on opposing sides of said block and wherein said block is cuboid.

20. A method as in claim 16, wherein said gas flow is controlled into a vacuum process chamber.

21. A method as in claim 20, wherein said vacuum process chamber is an atomic layer deposition process chamber.

22. A method as in claim 16, further comprising the step of monitoring the electrical characteristics of said block for determining the compressive load on said block.

23. A method as in claim 16, further comprising the step of monitoring the electrical characteristics of said block for determining properties of said gas.

24. A method as in claim 16, wherein said controlling step includes application of a potential difference between first and second plates on opposing sides of said block, said plates being planar and roughly parallel to the walls of the carbon nanotubes in said block, and wherein between said first and second plates and said block are corresponding first and second layers of insulating piezoelectric polymer.

25. A valve for controlling flow of a gas, comprising:
a valve housing;
a block of aligned carbon nanotubes, said block and said valve housing being configured to direct said gas through the carbon nanotubes in said block; and
first and second electrodes on opposing sides of said block, said electrodes being planar and roughly parallel to the walls of the carbon nanotubes in said block;
wherein between said first and second electrodes and said block are corresponding first and second piezoelectric layers.

* * * * *